Patented Aug. 2, 1932

1,869,621

UNITED STATES PATENT OFFICE

LUDWIG ROSENSTEIN, OF SAN FRANCISCO, AND KENNETH G. BELL, OF BARTLETT, CALIFORNIA, ASSIGNORS TO PACIFIC ALKALI COMPANY, OF LOS ANGELES, CALIFORNIA, A CORPORATION OF DELAWARE

RECOVERY OF SODIUM CARBONATE FROM BRINE

No Drawing. Application filed July 26, 1930. Serial No. 471,102.

This invention relates to the recovery of commercially pure sodium carbonate from brine containing the same, and more particularly, to the recovery of sodium carbonate substantially free from sodium sulphate, from natural or artificial brine containing sodium carbonate and also containing appreciable quantities of sodium sulphate. This invention is intended and adapted particularly for the treatment of natural soda bearing brines, such as occur, for example, at Owens Lake, California, and at other places in the western part of the United States, or of aqueous solutions derived from salts deposited from such brines, it will be understood that it may be applied to any brine or aqueous solution containing sodium carbonate in recoverable quantities and also containing appreciable quantities of sodium sulphate.

In attempting to recover sodium carbonate from brine containing both sodium carbonate and sodium sulphate, by methods of crystallization, it has been impossible to avoid contamination of the crystalline sodium carbonate by objectionable proportions of sodium sulphate, and the principal object of this invention is to avoid such contamination and to provide simple means involving crystallization only whereby a substantially pure crystalline sodium carbonate product can be obtained from a brine such as above described.

It has been found that the presence of sodium sulphate in the sodium carbonate ordinarily obtained by crystallization from such a brine, is due to the formation of solid solutions of sodium sulphate in the sodium carbonate crystals. The two best known forms of crystalline sodium carbonate are the monohydrate, $Na_2CO_3.1H_2O$, and the decahydrate, $Na_2CO_3.10H_2O$. Under ordinary methods of crystallization, the sodium carbonate has been largely or wholly crystallized in one or the other, or both, of the above forms, and we have found that both of these forms, namely, the monohydrate and the decahydrate form definite solid solutions of sodium sulphate therein when the crystallization thereof takes place from aqueous solutions containing sodium sulphate, and that there is a definite relationship between the concentration of sodium sulphate in the solid and liquid phases, this relationship being known as the distribution ratio. This distribution ratio varies, of course, with changes in temperature and with variations in the proportions of other constituents in the brine, but it has been found to be impossible to crystallize the decahydrate entirely free from sodium sulphate, by cooling brine or aqueous solutions in which appreciable quantities of sodium sulphate are present. In general, the monohydrate cannot be obtained except by first bringing about evaporation, and then sodium sulphate will appear in definite proportion in the crystals.

However, there is another less commonly known form of crystalline sodium carbonate, namely, the heptahydrate, $Na_2CO_3.7H_2O$, which is the stable crystalline form in equilibrium with a saturated sodium carbonate solution within a narrow range of temperature between approximately 30 and 33° C. when sodium sulphate is also present, these exact temperatures varying somewhat with the concentration of other constituents in the solution. At temperatures above this range the monohydrate is the stable crystalline form, while at temperatures below this range the decahydrate is the stable form. Our present invention is based upon the discovery that this other crystalline form of sodium carbonate, namely, the heptahydrate, does not form solid solutions with sodium sulphate, even when crystallized from aqueous solutions containing considerable quantities of sodium sulphate. The essential feature of our invention, therefore, consists in crystallization of the sodium carbonate, from or in contact with an aqueous solution saturated with sodium carbonate and also containing appreciable quantities of sodium sulphate, under such conditions as to cause crystallization to occur largely in the form of the heptahydrate, that is to say, at a temperature corresponding to the transition temperature from $Na_2CO_3.1H_2O$ to $Na_2CO_3.7H_2O$ or lying between the transition temperature from $Na_2CO_3.7H_2O$ to $Na_2CO_3.10H_2O$ and the transition temperature from $Na_2CO_3.1H_2O$ to $Na_2CO_3.7H_2O$ for the particular aqueous solution from which the crystallization is effected.

In the recovery of sodium carbonate from natural brine, in order to avoid the necessity of concentrating the entire body of brine and to also separate the sodium carbonate from a considerable proportion of the impurities ordinarily present in the brine before the final crystallization thereof, we prefer to first cool the brine, to a sufficiently low temperature to cause crystallization therefrom of a considerable proportion of the sodium carbonate content. For example, the brine may be cooled to approximately +5° C., at which temperature a large portion of the sodium carbonate content crystallizes in the form of sodium carbonate decahydrate. These crystals may then be separated by filtering, centrifuging or in any other suitable manner.

The crystals so obtained contain sodium sulphate in solid solution, and in order to purify the same said crystals may be heated in an evaporator and concentrated by evaporation of water therefrom at the boiling point of the solution formed by the dissolving of the crystals in their own water of crystallization. This evaporation or concentration may be carried out either at atmospheric pressure or under any desired vacuum, the boiling temperature varying, of course, with the pressure. The solution is concentrated in this manner until the water content is sufficiently reduced to provide a satisfactory yield of sodium carbonate crystals at the temperature of crystallization of the heptahydrate form. For example, according to a preferred mode of procedure, the evaporation may be continued until approximately 50% of the water has been removed. During this evaporation the solution becomes saturated and some crystallization occurs in the form of the monohydrate, containing in solid solution appreciable quantities of sodium sulphate.

The solution may then be cooled, and we prefer to accomplish at least a part of this cooling by the addition of a further quantity of sodium carbonate decahydrate. The conversion of this decahydrate to the monohydrate, which occurs at the temperature then existing in the brine, absorbs considerable heat, and quickly reduces the temperature of the solution. When the temperature falls to about 33° C., the sodium heptahydrate becomes the stable form, and by further removal of heat either by suitable cooling means or by addition of further quantities of sodium carbonate decahydrate, the monohydrate crystals may all be converted to the form of heptahydrate, and further crystallization of heptahydrate from the solution may also be obtained, provided the solution is kept throughout this period within the temperature range at which the heptahydrate is the stable crystalline form. This crystallization is preferably continued until crystals of the desired size are obtained. The sodium carbonate heptahydrate thus crystallized is substantially free from sodium sulphate, and may be separated in any suitable manner and washed to remove adherent mother liquor.

In case the cooling of the solution from the temperature of evaporation to the temperature of crystallization of the heptahydrate is effected wholly by mechanical cooling means, and without the addition of any further sodium carbonate decahydrate, the evaporation should not be carried so far. For example, in that case the evaporation may be continued until only about 25% of the water has been removed, so that there will still be sufficient water present, when cooled to the temperature of crystallization of the heptahydrate, to provide the necessary proportion of water for formation of these crystals and also provide sufficient additional water to hold the sodium sulphate and any other minor impurities in solution. It will be understood that when the cooling is accomplished wholly or in part by addition of sodium carbonate decahydrate, this added decahydrate will furnish a higher proportion of water than is removed in the heptahydrate crystals, and it is for this reason that the evaporation may, in that case, be carried further than when the cooling is to be accomplished without addition of the decahydrate.

The following may be given as a typical example of the application of our invention to one specific type of brine, it being understood, however, that the exact figures given herein are by way of example only.

The brine used was obtained from Owens Lake, California, and contained the following constituents:

$Na_2CO_3$ ------------------------------- 13 %
$Na_2SO_4$ ------------------------------- 3.3%
$NaCl$ ----------------------------------- 15 %

The brine also contained a certain amount of borax, the percentage of which is immaterial for the purpose of this invention, and also contained minor quantities of other ingredients which also need not be considered. A quantity of this brine was cooled to 5° C., whereupon crystals separated, consisting principally of sodium carbonate decahydrate crystals containing sodium sulphate in solid solution. These crystals, when separated from the remaining brine or mother liquor and properly washed, were found to have the composition:

$Na_2CO_3$ ------------------------------- 32 %
$Na_2SO_4$ ------------------------------- 2 %
$NaCl$ ----------------------------------- 0.2%
Water ----------------------------------- 65.8%
Other constituents (immaterial) ---- Trace It is to be particularly noted that the $Na_2SO_4$ in this material was not present merely in adherent mother liquor nor was it present in the form of separate and distinct crystals. On the contrary, it was intimately associated with the sodium carbonate crystals in the form generally known as a solid solution. Having obtained these decahydrate crystals contaminated with sodium sulphate, it is necessary, therefore, to purify the same, before the material is of sufficient purity for making commercial soda ash or other commercial sodium carbonate products. This purification was accomplished as follows:

1000 kilograms of decahydrate crystals obtained as above were placed in an evaporator heated with steam coils. Heat was applied, causing the crystals to dissolve in their own water of crystallization, and the temperature was raised to the boiling point of the solution, which was about 103° C. at atmospheric pressure. The evaporation of water caused the solution to become saturated with $Na_2CO_3$ and crystallization thereof to occur in the form of monohydrate. This was continued until 330 kilograms of water were driven off, which represented approximately 50% of the water present in the original crystals. At this time the contents of the evaporator consisted of a saturated solution of sodium carbonate, containing suspended crystals of sodium carbonate monohydrate holding sodium sulphate in solid solution. If these monohydrate crystals were removed at this stage, they would contain sodium sulphate in such amounts as to preclude preparation of commercially pure soda ash or other soda products.

Therefore, in order to effect this purification, the material was removed from the evaporator into a crystallizing tank, and after cooling to about 60° C., a further quantity of sodium carbonate decahydrate originally crystallized from the brine was added thereto. This decahydrate was transformed into the monohydrate, resulting in the absorption of heat from the system, until the transition temperature from monohydrate to heptahydrate was reached. A further quantity of heat was then removed from the mass, partially by circulation of cooling medium through coils in the crystallizing tank and partially by addition of a further quantity of sodium carbonate decahydrate. During the greater part of this time the temperature remained substantially constant, but the entire quantity of decahydrate crystals and monohydrate crystals were converted to the form of heptahydrate, and a further quantity of heptahydrate crystals also separated due to the removal of additional water of crystallization from the solution. The total amount of decahydrate added for the purpose of removing heat from the solution was 1000 kilograms, and at the end of this operation all of the sodium carbonate, including that present in the original 1000 kilograms of decahydrate and also that present in the 1000 kilograms of decahydrate subsequently added, was present either in the form of heptahydrate or in solution in the mother liquor.

It is to be noted that the change from the monohydrate to the heptahydrate crystal form evolves heat, and, as pointed out above, this heat must be removed in order for the change to proceed. In fact this transition can proceed only insofar and at the rate at which heat is removed, so that the rate of heat removal during the formation of the heptahydrate crystals gives a simple and positive means for control of the rate of crystal growth and hence of the size of crystals obtained.

It should also be observed that during this time the temperature must be held between comparatively narrow limits, that is to say, between the transition temperature between the monohydrate to the heptahydrate and the transition temperature from the heptahydrate to the decahydrate. Both of these transition temperatures vary with the concentration of sodium sulphate and other impurities present in the solution. For the particular case above described, the first transition temperature was substantially 33° C. and the second transition temperature was substantially 30.3° C.

The crystals formed were then removed and were found to consist substantially of sodium carbonate heptahydrate, the sodium sulphate and other impurities being present only to the very small extent represented by adherent mother liquor. The yield of the heptahydrate crystals represented approximately 85% of the sodium carbonate introduced in the process. After separation from the mother liquor by filtering, centrifuging or in any other suitable manner, and washing to remove adherent mother liquor, these crystals consisted of practically pure sodium carbonate containing only water of crystallization.

The crystallized and washed product obtained as above described may be sold or used as such or may be transformed to soda ash or other commercial sodium carbonate products by suitable methods well known in the art.

The mother liquor remaining after the crystallization of the heptahydrate may be returned to the cycle, either to the brine before the original crystallization of sodium carbonate decahydrate therefrom or at the beginning of the evaporation stage. Provision should be made, however, for preventing undue accumulation of impurities in the system, so that a portion at least of this mother liquor should be returned to the brine rather than to the solution from which the final crystallization is to be effected.

It is to be understood that the above procedure may be modified considerably in different cases, depending upon the nature of the brine or aqueous solution from which the recovery of sodium carbonate is to be effected, and particularly upon the kind and quantity of other constituents present therein. The method particularly described above is adapted, as stated, to the treatment of Owens Lake brine. This brine is saturated, or substantially saturated, with sodium chloride, and the direct crystallization of sodium carbonate heptahydrate therefrom is impossible, as the field of this crystalline form disappears entirely in the presence of this high concentration of sodium chloride. For this reason the above described method, involving a first crystallization at a relatively low temperature and separation of the crystals thus formed, followed by evaporation of a part of the water contained in these crystals and a second crystallization at or slightly below the transition temperature from $Na_2CO_3.1H_2O$ to $Na_2CO_3.7H_2O$, has been found particularly advantageous. However, in applying the invention to other sodium carbonate bearing brines or aqueous solutions, containing appreciable quantities of sodium sulphate, but sufficiently low in other impurities, such as sodium chloride, to permit direct crystallization of $Na_2CO_3.7H_2O$ therefrom, the recovery may be effected by first concentrating the solution, if necessary, to provide such a concentration of sodium carbonate that upon subsequent cooling to the approximate temperature at which the heptahydrate is the crystalline form a suitable proportion of the sodium carbonate content will crystallize, and then cooling the solution to this temperature to cause such crystallization to occur and separating the crystals thus formed.

Another possible application of the invention consists in purifying a quantity of decahydrate containing an objectionable amount of sodium sulphate (such as that obtained in the first or low temperature crystallization from Owens Lake brine, as above described) by merely heating the decahydrate crystals to a temperature at which the heptahydrate is the stable crystalline form, and maintaining the system at this temperature for a sufficient length of time to cause the desired conversion of the decahydrate crystals to heptahydrate crystals. Such heptahydrate crystals would be substantially free from sodium sulphate, which would be substantially wholly in solution in the mother liquor. The crystals may then be separated from this mother liquor, giving a crystallized product consisting substantially of commercially pure sodium carbonate.

In any event, however, the process includes, as an essential step, the crystallization of the sodium carbonate in contact with a saturated solution thereof at substantially the transition temperature from $Na_2CO_3.1H_2O$ to $Na_2CO_3.7H_2O$ or at a temperature between this transition temperature and the transition temperature from $Na_2CO_3.7H_2O$ to $Na_2CO_3.10H_2O$.

We claim:

1. The method of obtaining sodium carbonate substantially free from sodium sulphate, from an aqueous solution containing sodium carbonate and also containing sodium sulphate, which comprises causing crystallization of sodium carbonate from said solution while maintaining the solution under such conditions as to cause such crystallization to occur substantially wholly in the form of sodium carbonate heptahydrate.

2. The method of obtaining sodium carbonate substantially free from sodium sulphate, from a system consisting principally of sodium carbonate and water and containing an appreciable quantity of sodium sulphate, which comprises causing crystallization of sodium carbonate in such a system to occur at a temperature at which the heptahydrate is the stable crystalline form thereof.

3. As a step in the manufacture of sodium carbonate of commercial purity from brine containing sodium carbonate and also containing an appreciable quantity of sodium sulphate, the crystallization of the sodium carbonate from an aqueous solution thereof under such conditions as to cause crystallization to occur substantially wholly in the form of sodium carbonate heptahydrate.

4. The method of recovering sodium carbonate substantially free from sodium sulphate, from an aqueous solution containing sodium carbonate and also containing an appreciable quantity of sodium sulphate, which comprises causing crystallization to occur while the temperature is maintained between the transition temperature from sodium carbonate monohydrate to sodium carbonate heptahydrate and the transition temperature from sodium carbonate heptahydrate to sodium carbonate decahydrate.

5. The method of recovering sodium carbonate substantially free from sodium sulphate, from an aqueous solution containing sodium carbonate and also containing an appreciable quantity of sodium sulphate, which comprises causing crystallization of sodium carbonate from said solution to occur substantially at the transition temperature which marks the change from $Na_2CO_3.1H_2O$ to $Na_2CO_3.7H_2O$.

6. The method of recovering sodium carbonate substantially free from sodium sulphate in solid solution, from an aqueous solution containing sodium carbonate and also containing an appreciable quantity of sodium sulphate which comprises bringing the concentration of sodium carbonate in said solution to such a point as to cause crystallization of sodium carbonate therefrom to occur when the temperautre is brought to a temperature at which the heptahydrate is the stable crystalline form thereof, and then bringing the solution substantially to said temperature and causing crystallization to occur.

7. The method of recovering sodium carbonate substantially free from sodium sulphate from an aqueous solution containing sodium carbonate and also containing an appreciable quantity of sodium sulphate which comprises concentrating said solution by evaporation of water therefrom so as to cause the solution to become saturated with respect to sodium carbonate and a portion of the sodium carbonate content thereof to crystallize, then cooling the solution to the transition temperature from sodium carbonate decahydrate to sodium carbonate heptahydrate, and then continuing to remove heat from the system so as to cause the sodium carbonate already crystallized to be converted largely to the form of heptahydrate and further crystallization from the solution also to occur largely in the form of the heptahydrate, while maintaining the temperature between the aforesaid transition temperature and the transition temperature from the heptahydrate to the decahydrate.

8. The method of recovering sodium carbonate substantially free from sodium sulphate, from brine containing sodium carbonate and also containing an appreciable quantity of sodium sulphate, which comprises cooling the brine to a temperature below atmospheric temperature to cause crystallization therefrom of sodium carbonate decahydrate containing sodium sulphate in solid solution, separating the resulting crystals, heating said crystals to cause the same to dissolve in their water of crystallization and to also evaporate a considerable portion of such water therefrom, then cooling the concentrated solution and causing crystallization of sodium carbonate heptahydrate to occur by removing heat from the system while maintaining the same at a temperature between the transition temperautre from sodium carbonate monohydrate to sodium carbonate heptahydrate and the transition temperature from sodium carbonate heptahydrate to sodium carbonate decahydrate.

9. The method of recovering sodium carbonate substantially free from sodium sulphate, from brine containing sodium carbonate and also containing an appreciable quantity of sodium sulphate, which comprises cooling the brine to a temperature sufficiently low to cause crystallization of a considerable portion of the sodium carbonate in the form of the decahydrate, containing sodium sulphate in solid solution, separating the resulting crystals, heating said crystals to cause the same to dissolve in their water of crystallization and to evaporate a considerable portion of such water, then removing heat from the system, at least partially by the addition of further decahydrate crystals thereto, to cool the same to the transition temperature from the monohydrate to the heptahydrate and cause the crystallization of substantially pure sodium carbonate heptahydrate, while maintaining the temperature between the aforesaid transition temperature and the transition temperature from the heptahydrate to the decahydrate.

10. The method of recovering substantially pure sodium carbonate from sodium carbonate contaminated with sodium sulphate which comprises bringing the sodium carbonate and sodium sulphate into solution in water, bringing the concentration of sodium carbonate in the solution to a value exceeding the solubility of sodium carbonate in such solution at a temperature at which the heptahydrate is the stable crystalline form thereof, then causing crystallization of sodium carbonate to occur while maintaining the solution substantially at said temperature, and separating the crystallized sodium carbonate from the mother liquor.

In testimony whereof we have hereunto subscribed our names.

LUDWIG ROSENSTEIN.
KENNETH G. BELL.